No. 869,523.　　　　　　　　　　　　　　PATENTED OCT. 29, 1907.
C. J. SCHMIDT.
FLOWER POT.
APPLICATION FILED DEC. 31, 1906.
2 SHEETS—SHEET 1.
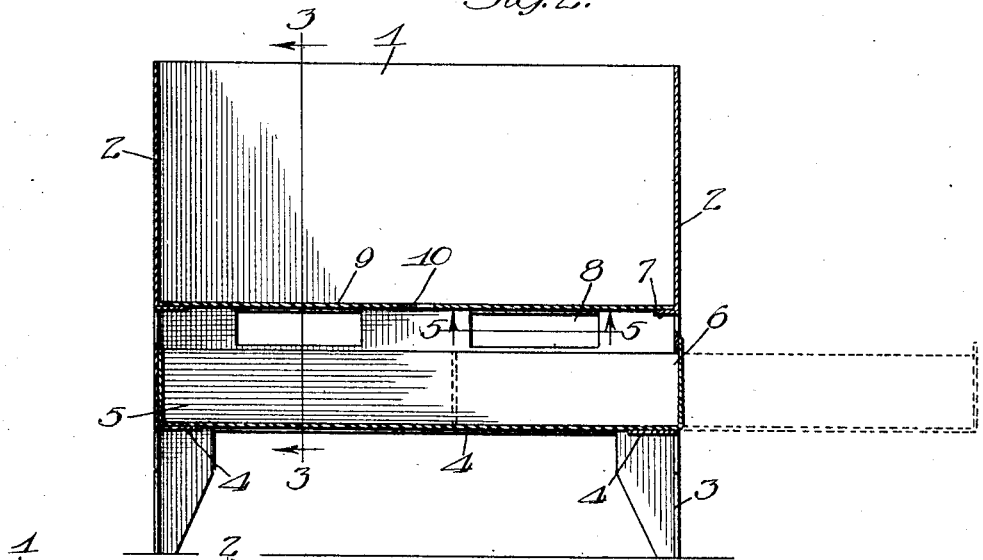
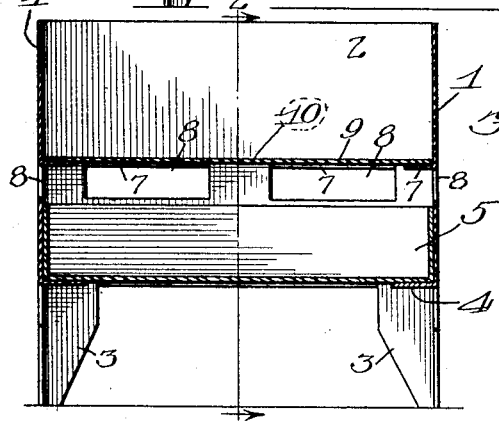
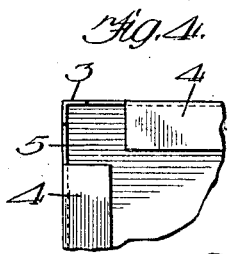
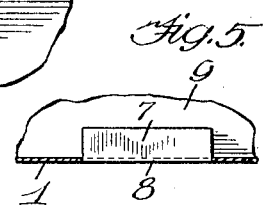
Witnesses:
Arthur Henry
W. Perry Haley
Inventor
Charles J. Schmidt
By Jones, Addington & Ames
Attys No. 869,523.
PATENTED OCT. 29, 1907.
C. J. SCHMIDT.
FLOWER POT.
APPLICATION FILED DEC. 31, 1906.
2 SHEETS—SHEET 2.
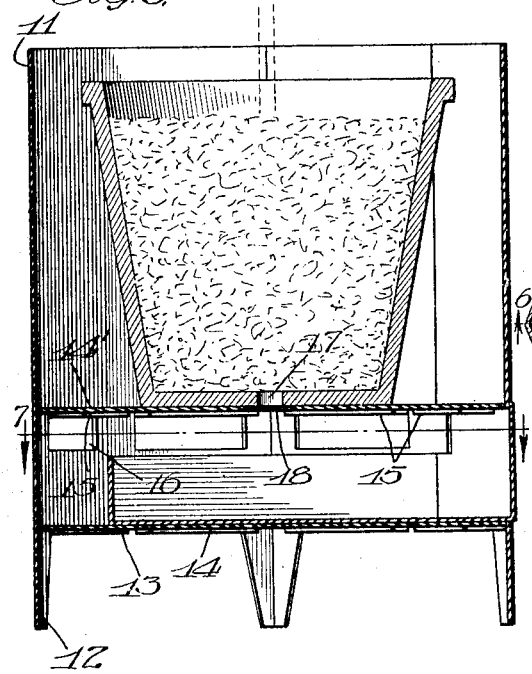
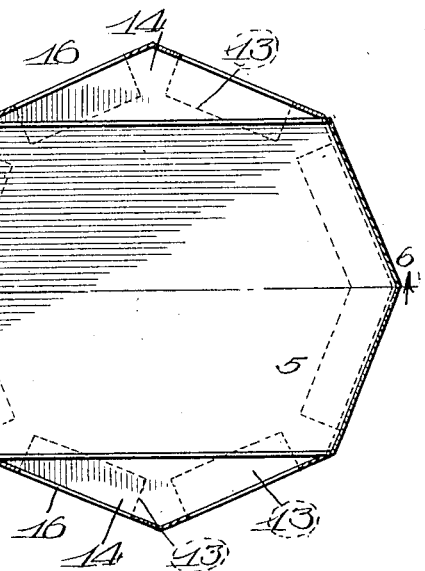
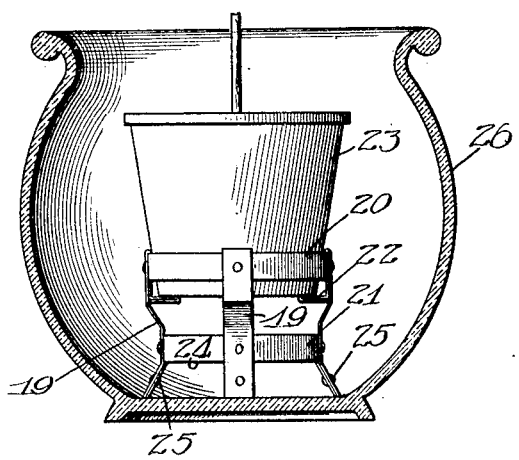
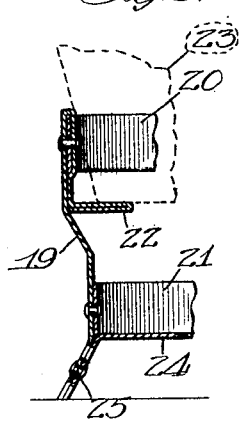
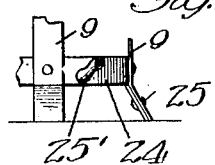
Witnesses:
Inventor:
Charles J. Schmidt

UNITED STATES PATENT OFFICE.

CHARLES J. SCHMIDT, OF CHICAGO, ILLINOIS.

FLOWER-POT.

No. 869,523.  Specification of Letters Patent.  Patented Oct. 29, 1907.

Application filed December 31, 1906. Serial No. 350,229.

*To all whom it may concern:*

Be it known that I, CHARLES J. SCHMIDT, a citizen of the United States, residing at Chicago, in the county of Cook and State of Illinois, have invented new and useful Improvements in Flower-Pots, of which the following is a full, clear, concise, and exact description, reference being had to the accompanying drawing, forming a part of this specification.

My invention relates to new and useful improvements in plant receptacles, the object of my invention being to provide a receptacle for growing plants, which shall present a pleasing appearance, and at the same time provide means for taking care of the waste water, and which will permit sufficient air to pass to the roots of the plant to maintain the plant in a healthy condition.

For the purpose of illustration I have shown one or more structures embodying my invention and in said drawings, Figure 1 is a perspective view of one form of my invention; Fig. 2 is a longitudinal sectional view taken on the line 2—2 of Fig. 3; Fig. 3 is a transverse sectional view taken on the line 3—3 of Fig. 2; Fig. 4 is a detail view of the lower portion of the plant receptacle; Fig. 5 is a detail sectional view taken on the line 5—5 of Fig. 2; Fig. 6 is a sectional view of a modified form of my invention taken on the line 6—6 of Fig. 7; Fig. 7 is a transverse section taken on the line 7—7 of Fig. 6; Fig. 8 is an elevation of still another form of my invention showing the same arranged in a jardinière; Fig. 9 is a detail view of the form of invention shown in Fig. 8; and, Fig. 10 is still another detail view of the form of invention shown in Fig. 8.

In the construction shown in Fig. 1 the plant is shown set in dirt placed within the receptacle. This receptacle consists of a box-like structure formed preferably of sheet metal and having the sides 1 and the ends 2 arranged to form a rectangular box. The lower portion of the ends and sides are cut away to form the legs 3 upon which the receptacle is arranged to sit. At the top of the legs flanges 4 are turned in, upon which rests a drawer 5 also formed of sheet metal and arranged to be slipped in position through an opening 6 in one of the ends of the receptacle. Above the drawer cut out portions are turned in to form flanges 7, leaving openings 8 between the drawer and the bottom 9 of the receptacle. This bottom 9 is formed of sheet metal and is supported in position upon the inturned flanges 7. The bottom 9 is provided with an opening 10 for drainage. In use the receptacle formed by the bottom 9 and the sides 1 and ends 2 is filled with dirt, and the plant or other flower is set therein. By the provision of the drawer 5 the surplus water which drains through the opening 10 in watering the plant will be taken care of, without closing the opening 10 to the air, the openings 8 providing for the free circulation of air beneath the bottom 9 and up through the opening 10.

In the structure illustrated in Figs. 6 and 7, instead of providing a longitudinal receptacle, I have provided an octagonal structure which may be used either in the manner illustrated with respect to Figs. 1 to 5 or to receive a potted plant. In the structure illustrated in Figs. 6 and 7, the sides 11 are continued downwardly and have portions cut out to form legs 12 and inturned flanges 13 are provided upon which rests a suitable bottom 14 of sheet metal or the like which supports the drawer receptacle. The drawer as in the structure illustrated in Figs. 1 to 5 is arranged to be slid into position through a suitable opening formed in the sides and arranged thereabove is a second bottom 14' supported by means of inturned flanges 15 stamped out of the sides 11. The openings 16 formed by the inturning of the flanges 15 provide for the circulation of air beneath the plant. In this structure the plant may be arranged in a suitable pot which is so placed that the opening in the bottom of the pot fits over the opening 18 formed in the bottom 14'.

In Figs. 8 to 10, still another form of structure is shown which is more adapted for use in connection with a jardinière and provides a stand upon which the potted plant may be set. In this structure a plurality of legs 19 preferably four in number are arranged about two bands 20 and 21, the band 20 being considerably larger than the band 21. The lower portion of the legs are spread at an angle to secure strength and bracing effect. The legs are folded over the band 20 and at a point intermediate of the band 20 and 21 are provided with inturned projections 22 which extend radially toward the center of the structure and provide a suitable support for the pot 23 of the plant. At the bottom of the band 21 is arranged a circular plate 24 having projections 25 which coincide with the bottoms of the legs 19 and are suitably secured thereto by rivets passing through the same as illustrated. The bottom 24 in connection with the band 21 forms a receptacle into which the excess of water may drain from the pot 23. At an opening in the band 21 is secured a small nozzle 25' the end of which under normal circumstances is on a level with the top of the band 21. When it is desired to draw off the water from the receptacle, this nozzle may be turned so that the end is level with or below the bottom of the receptacle. I have illustrated the structure shown in Figs. 8 to 10 as holding a plant in a jardinière 26; but it will be understood that the jardinière may be dispensed with if desired.

Having thus described my invention what I claim as new and desire to secure by Letters Patent, is:

1. A plant receptacle comprising a sheet metal box, inwardly extending lugs therein, a partition resting on said lugs and disposed parallel to the bottom thereof, openings being formed in the sides of the box between the bottom and said partition, and a drawer supported by said bottom and disposed proximate to an opening in said partition.

2. A plant receptacle comprising a sheet metal box having a drawer supported by the bottom thereof, a bottom for supporting the plant and air inlets formed in the sides of the receptacle between the drawer and the bottom to permit the circulation of air.

3. A plant receptacle comprising a box having arranged in the bottom thereof a removable drawer for drainage purposes, a bottom supported above said drawer for supporting the plant and having an opening therein leading to said drawer, the sides of said receptacle having inturned flanges for supporting said false bottom and having openings formed between the drawer and false bottom for the free circulation of air.

4. A plant receptacle comprising a sheet metal box, a partition therefor, the sides of said box being stamped to form inturned flanges for supporting said partition, thereby leaving openings in the sides between said partition and the bottom of the box, and a drawer supported by the bottom of the box and disposed proximate to an opening in said partition.

5. A plant receptacle comprising a sheet metal box, a partition therefor, the sides of said box being stamped to form legs therefor and to form inturned flanges for supporting the bottom of the box and inturned flanges for supporting said partition, thereby leaving openings in the sides between said partition and the bottom of the box, and a drawer supported by the bottom of the box and disposed proximate to an opening in said partition.

In witness whereof, I have hereunto subscribed my name in the presence of two witnesses.

CHARLES J. SCHMIDT.

Witnesses:
W. PERRY HAHN,
M. R. ROCHFORD.